United States Patent
Nakashima et al.

(10) Patent No.: US 10,280,298 B2
(45) Date of Patent: May 7, 2019

(54) HIGHLY SATURATED NITRILE RUBBER COMPOSITION AND CROSS-LINKED RUBBER

(75) Inventors: Tomonori Nakashima, Tokyo (JP); Masato Sakamoto, Tokyo (JP)

(73) Assignee: ZEON CORPORATION, Tokyo (JP)

(*) Notice: Subject to any disclaimer, the term of this patent is extended or adjusted under 35 U.S.C. 154(b) by 281 days.

(21) Appl. No.: 14/004,172

(22) PCT Filed: Mar. 29, 2012

(86) PCT No.: PCT/JP2012/058308
§ 371 (c)(1),
(2), (4) Date: Sep. 10, 2013

(87) PCT Pub. No.: WO2012/133618
PCT Pub. Date: Oct. 4, 2012

(65) Prior Publication Data
US 2014/0065336 A1 Mar. 6, 2014

(30) Foreign Application Priority Data
Mar. 31, 2011 (JP) ................................. 2011-077180

(51) Int. Cl.
| | | |
|---|---|---|
| B32B 1/08 | (2006.01) | |
| C08L 33/20 | (2006.01) | |
| C08L 15/00 | (2006.01) | |
| C08C 19/02 | (2006.01) | |
| C08F 236/12 | (2006.01) | |
| C08L 13/00 | (2006.01) | |
| C08L 77/00 | (2006.01) | |
| C08K 5/14 | (2006.01) | |
| C08L 77/02 | (2006.01) | |
| C08L 77/06 | (2006.01) | |

(52) U.S. Cl.
CPC .............. *C08L 33/20* (2013.01); *C08C 19/02* (2013.01); *C08F 236/12* (2013.01); *C08L 13/00* (2013.01); *C08L 15/005* (2013.01); *C08L 77/00* (2013.01); *C08K 5/14* (2013.01); *C08L 77/02* (2013.01); *C08L 77/06* (2013.01); *C08L 2312/00* (2013.01); *Y10T 428/1386* (2015.01)

(58) Field of Classification Search
CPC ........... Y10T 428/139; Y10T 428/1352; Y10T 428/1386; B32B 1/02; B32B 1/08; C08L 33/20; C08L 15/005; C08L 13/00; C08L 77/06; C08L 2312/00; C08C 19/02; C08F 236/12; C08K 5/14
USPC .................... 428/34.1, 34.2, 35.7, 36.9, 36.8
See application file for complete search history.

(56) References Cited

U.S. PATENT DOCUMENTS

| | | | | |
|---|---|---|---|---|
| 5,246,994 A | * | 9/1993 | Shibahara | C08F 267/08 524/210 |
| 8,133,948 B2 | * | 3/2012 | Nagamori | C08K 5/098 524/492 |
| 2006/0100374 A1 | * | 5/2006 | Hamada | B32B 25/02 525/132 |
| 2006/0128894 A1 | | 6/2006 | Nasreddine et al. | |
| 2009/0162672 A1 | * | 6/2009 | Dunn | C09K 3/1028 428/446 |
| 2011/0301300 A1 | | 12/2011 | Iizuka | |

FOREIGN PATENT DOCUMENTS

| | | |
|---|---|---|
| CA | 2 304 501 A1 | 10/2001 |
| CN | 1551901 A | 12/2004 |
| EP | 1 234 851 A1 | 8/2002 |
| EP | 1669395 A1 * | 6/2006 |
| EP | 1 743 918 A1 | 1/2007 |
| EP | 1 964 882 A1 | 9/2008 |
| EP | 2 009 050 A1 | 12/2008 |
| EP | 2 239 297 A1 | 10/2010 |
| JP | 10-251452 A | 9/1998 |
| JP | 2006-169523 A | 6/2006 |
| JP | 2008-056793 A | 3/2008 |
| JP | 2008056793 A * | 3/2008 |
| WO | WO 03/020820 A1 | 3/2003 |

(Continued)

OTHER PUBLICATIONS

Office Action issued in corresponding Russia Patent Application No. 2013143031/05 (066076) dated Dec. 9, 2015 (with English translation).
International Search Report issued in PCT/JP2012/058308 dated Apr. 24, 2012.
Russian Office Action dated Sep. 16, 2015, for Russian Application No. 2013143031/05 with the English translation.
Mexican Office Action, dated Jul. 4, 2017, for corresponding Mexican Application No. MX/a/2013/011190, with an English translation.

(Continued)

*Primary Examiner* — Marc A Patterson
(74) *Attorney, Agent, or Firm* — Birch, Stewart, Kolasch & Birch, LLP

(57) ABSTRACT

A highly saturated nitrile rubber composition containing a carboxyl group-containing highly saturated nitrile rubber (A1) which contains α,β-ethylenically unsaturated nitrile monomer units 15 to 60 wt % and α,β-ethylenically unsaturated dicarboxylic acid monoester monomer units 1 to 60 wt % and has an iodine value of 120 or less, a highly saturated nitrile rubber (A2) which contains α,β-ethylenically unsaturated nitrile monomer units 15 to 60 wt %, has a content of the α,β-ethylenically unsaturated dicarboxylic acid monoester monomer units of 0.9 wt % or less, and has an iodine value of 120 or less, and a polyamide resin (B), a content ratio of the carboxyl group-containing highly saturated nitrile rubber (A1) and the highly saturated nitrile rubber (A2) being a weight ratio of "carboxyl group-containing highly saturated nitrile rubber (A1):highly saturated nitrile rubber (A2)" of 2:98 to 98:2, is provided.

10 Claims, No Drawings

(56) References Cited

FOREIGN PATENT DOCUMENTS

WO     WO 2003/020820 A1     3/2003
WO     WO 2010/087431 A1     8/2010

OTHER PUBLICATIONS

Office Action issued in corresponding Mexican Application No. 2013/011190 dated Nov. 17, 2016 (with English language summary).
Notice of Opposition issued in corresponding EP Application No. 12764515.8 on Oct. 5, 2016 (with English translation).
Canadian Office Action issued in corresponding Canadian Application No. 2,829,756 and dated Aug. 25, 2016.
Canadian Office Action issued in corresponding Canadian Application No. 2,829,756 and dated May 1, 2018.
Indian Examination Report and English translation, dated Oct. 10, 2017, for corresponding Indian Application No. 7570/DELNP/2013.

* cited by examiner

HIGHLY SATURATED NITRILE RUBBER COMPOSITION AND CROSS-LINKED RUBBER

TECHNICAL FIELD

The present invention relates to a highly saturated nitrile rubber composition which is excellent in rollability and which is able to give a cross-linked rubber which is excellent in normal physical properties, oil resistance, fuel oil resistance, and tensile strength under a high temperature and to a cross-linked rubber obtained by using the rubber composition.

BACKGROUND ART

Since the past, nitrile rubber (acrylonitrile-butadiene copolymer rubber) has been used as a material for hoses, tubes, and other automotive use rubber parts by making use of its fuel oil resistance, mechanical properties, chemical resistance, etc. Further, hydrogenated nitrile rubber (highly saturated nitrile rubber) which is obtained by hydrogenating the carbon-carbon double bonds in the polymer main chain of nitrile rubber is further excellent in heat resistance, so is being used for belts, hoses, seals, gaskets, diaphragms, and other rubber parts.

In recent years, the demands for the properties of automobile use rubber parts have become severe. In belts, hoses, seals, gaskets, diaphragms, and other rubber parts, further improvements are being sought in the normal physical properties, oil resistance, fuel oil resistance, tensile strength under a high temperature etc.

In this situation, Patent Document 1 discloses a rubber composition which comprises a hydrogenated NBR elastomer matrix in which microparticles comprised of Nylon are present dispersed and contains a functional group-containing ethylene-based copolymer. According to the rubber composition which is described in this Patent Document 1, while cross-linked articles which have appropriately improved normal physical properties are obtained, but there is the problem that the rollability (wrapability on the roll) is poor and the problem that the oil resistance, fuel oil resistance, and tensile strength under a high temperature are inferior.

PRIOR ART DOCUMENTS

Patent Documents

Patent Document 1: Japanese Patent Publication No. 10-251452A

DISCLOSURE OF THE INVENTION

Problem to be Solved by the Invention

The present invention has as its object the provision of a highly saturated nitrile rubber composition which is excellent in rollability and which is able to give a cross-linked rubber which is excellent in normal physical properties, oil resistance, fuel oil resistance, and tensile strength under a high temperature and a cross-linked rubber obtained by using the rubber composition.

Means for Solving the Problems

The present inventors engaged in in-depth research for achieving the above-mentioned object and as a result discovered that a rubber composition obtained by jointly using, as a highly saturated nitrile rubber, a carboxyl group-containing highly saturated nitrile rubber (A1) which contains α,β-ethylenically unsaturated dicarboxylic acid monoester monomer units in 1 to 60 wt % and highly saturated nitrile rubber (A2) with a content of α,β-ethylenically unsaturated dicarboxylic acid monoester monomer units of 0.9 wt % or less in a specific ratio, and by blending into this a polyamide resin (B), is excellent in rollability and can give a cross-linked rubber which is excellent in normal physical properties, oil resistance, fuel oil resistance, and tensile strength under a high temperature and thereby completed the present invention.

That is, according to the present invention, there is provided a highly saturated nitrile rubber composition containing a carboxyl group-containing highly saturated nitrile rubber (A1) which contains α,β-ethylenically unsaturated nitrile monomer units 15 to 60 wt % and α,β-ethylenically unsaturated dicarboxylic acid monoester monomer units 1 to 60 wt % and has an iodine value of 120 or less, a highly saturated nitrile rubber (A2) which contains α,β-ethylenically unsaturated nitrile monomer units 15 to 60 wt %, has a content of the α,β-ethylenically unsaturated dicarboxylic acid monoester monomer units of 0.9 wt % or less, and has an iodine value of 120 or less, and a polyamide resin (B), a content ratio of the carboxyl group-containing highly saturated nitrile rubber (A1) and the highly saturated nitrile rubber (A2) being a weight ratio of "carboxyl group-containing highly saturated nitrile rubber (A1):highly saturated nitrile rubber (A2)" of 2:98 to 98:2.

Preferably, the polyamide resin (B) has a melting point of 100 to 300° C.

Preferably, the α,β-ethylenically unsaturated dicarboxylic acid monoester monomer units of the carboxyl group-containing highly saturated nitrile rubber (A1) are monoalkyl ester units of maleic acid.

Preferably, a content of the polyamide resin (B) with respect to a total amount of the carboxyl group-containing highly saturated nitrile rubber (A1) and the highly saturated nitrile rubber (A2) is, by weight ratio of "total amount of carboxyl group-containing highly saturated nitrile rubber (A1) and highly saturated nitrile rubber (A2):content of polyamide resin (B)", 95:5 to 50:50.

Preferably, it is obtained by kneading the carboxyl group-containing highly saturated nitrile rubber (A1), the highly saturated nitrile rubber (A2), and the polyamide resin (B) at a temperature of 200° C. or more, more preferably, it is obtained by kneading the carboxyl group-containing highly saturated nitrile rubber (A1), the highly saturated nitrile rubber (A2), and the polyamide resin (B) at a temperature of 200° C. or more by a twin screw extruder.

Further, according to the present invention, there is provided a cross-linkable nitrile rubber composition obtained by blending an organic peroxide cross-linking agent (C) into the highly saturated nitrile rubber composition as set forth in any of the above.

Further, according to the present invention, there is provided a cross-linked rubber obtained by cross-linking the above-mentioned cross-linkable nitrile rubber composition. The cross-linked rubber is preferably a seal material, gasket, belt, or hose.

Further, the method of production of the highly saturated nitrile rubber composition preferably comprises kneading the carboxyl group-containing highly saturated nitrile rubber (A1), the highly saturated nitrile rubber (A2), and the polyamide resin (B) at temperature of a 200° C. or more, particularly preferably by using a twin screw extruder.

Effects of the Invention

According to the present invention, there is provided a highly saturated nitrile rubber composition which is excellent in rollability and which is able to give a cross-linked rubber which is excellent in normal physical properties, oil resistance, fuel oil resistance, and tensile strength under a high temperature and a cross-linked rubber which is obtained using the rubber composition and which is excellent in normal physical properties, oil resistance, fuel oil resistance, and tensile strength under a high temperature.

DESCRIPTION OF EMBODIMENTS

Highly Saturated Nitrile Rubber Composition

The highly saturated nitrile rubber composition of the present invention contains a carboxyl group-containing highly saturated nitrile rubber (A1) which contains α,β-ethylenically unsaturated nitrile monomer units 15 to 60 wt % and α,β-ethylenically unsaturated dicarboxylic acid monoester monomer units 1 to 60 wt % and has an iodine value of 120 or less, highly saturated nitrile rubber (A2) which contains α,β-ethylenically unsaturated nitrile monomer units 15 to 60 wt %, has a content of the α,β-ethylenically unsaturated dicarboxylic acid monoester monomer units of 0.9 wt % or less, and has an iodine value of 120 or less, and a polyamide resin (B).

Carboxyl Group-Containing Highly Saturated Nitrile Rubber (A1)

The carboxyl group-containing highly saturated nitrile rubber (A1) used in the present invention is a rubber which contains α,β-ethylenically unsaturated nitrile monomer units 15 to 60 wt % and α,β-ethylenically unsaturated dicarboxylic acid monoester monomer units 1 to 60 wt % and has an iodine value of 120 or less. The carboxyl group-containing highly saturated nitrile rubber (A1) used in the present invention is obtained by copolymerizing an α,β-ethylenically unsaturated nitrile monomer, α,β-ethylenically unsaturated dicarboxylic acid monoester monomer, and other copolymerizable monomer which is added in accordance with need.

The α,β-ethylenically unsaturated nitrile monomer is not particularly limited so long as an α,β-ethylenically unsaturated compound which has a nitrile group. For example, acrylonitrile; α-chloroacrylonitrile, α-bromoacrylonitrile, and other α-halogenoacrylonitriles; methacrylonitrile and other α-alkyl acrylonitriles; etc. may be mentioned. Among these as well, acrylonitrile and methacrylonitrile are preferable, while acrylonitrile is more preferable. The α,β-ethylenically unsaturated nitrile monomer may be used as single type alone or as a plurality of types together.

The content of the α,β-ethylenically unsaturated nitrile monomer units is 15 to 60 wt % with respect to the total monomer units, preferably 18 to 55 wt %, more preferably 20 to 50 wt %. If the content of the α,β-ethylenically unsaturated nitrile monomer units is too small, the obtained cross-linked rubber is liable to fall in oil resistance and fuel oil resistance, while, conversely, if too large, the cold resistance may fall.

As the α,β-ethylenically unsaturated dicarboxylic acid monoester monomer, monomethyl maleate, monoethyl maleate, monopropyl maleate, mono n-butyl maleate, and other maleic acid monoalkyl esters; monocyclopentyl maleate, monocyclohexyl maleate, monocycloheptyl maleate, and other maleic acid monocycloalkyl esters; monomethylcyclopentyl maleate, monoethylcyclohexyl maleate, and other maleic acid monoalkyl cycloalkyl esters; monomethyl fumarate, monoethyl fumarate, monopropyl fumarate, mono n-butyl fumarate, and other fumaric acid monoalkyl esters; monocyclopentyl fumarate, monocyclohexyl fumarate, monocycloheptyl fumarate, and other fumaric acid monocycloalkyl esters; monomethylcyclopentyl fumarate, monoethylcyclohexyl fumarate, and other fumaric acid monoalkyl cycloalkyl esters; monomethyl citraconate, monoethyl citraconate, monopropyl citraconate, mono n-butyl citraconate, and other citraconic acid monoalkyl esters; monocyclopentyl citraconate, monocyclohexyl citraconate, monocycloheptyl citraconate, and other citraconic acid monocycloalkyl esters; monomethylcyclopentyl citraconate, monoethylcyclohexyl citraconate, and other citraconic acid monoalkyl cycloalkyl esters; monomethyl itaconate, monoethyl itaconate, monopropyl itaconate, mono n-butyl itaconate, and other itaconic acid monoalkyl esters; monocyclopentyl itaconate, monocyclohexyl itaconate, monocycloheptyl itaconate, and other itaconic acid monocycloalkyl esters; monomethylcyclopentyl itaconate, monoethylcyclohexyl itaconate, and other itaconic acid monoalkyl cycloalkyl esters; etc. may be mentioned. Among these as well, maleic acid monoalkyl esters are preferable, maleic acid monoalkyl esters with $C_2$ to $C_6$ alkyl group are more preferable, and mono n-butyl maleate is particularly preferable. The α,β-ethylenically unsaturated dicarboxylic acid monoester monomers may be used as single type alone or as a plurality of types together.

The content of the α,β-ethylenically unsaturated dicarboxylic acid monoester monomer units is 1 to 60 wt % with respect to the total monomer units, preferably 2 to 20 wt %, more preferably 2 to 10 wt %. If the content of the α,β-ethylenically unsaturated dicarboxylic acid monoester monomer units is too small, the rollability falls and the obtained cross-linked rubber ends up becoming inferior in tensile strength under a high temperature. On the other hand, if too large, the compression set resistance and heat resistance are liable to deteriorate.

Further, the carboxyl group-containing highly saturated nitrile rubber (A1) used in the present invention preferably has conjugated diene monomer units so that the obtained cross-linked rubber has rubber elasticity.

As the conjugated diene monomers which form the conjugated diene monomer units, 1,3-butadiene, isoprene, 2,3-dimethyl-1,3-butadiene, 1,3-pentadiene, chloroprene, and other $C_4$ to $C_6$ conjugated diene monomers are preferable, 1,3-butadiene and isoprene are more preferable, and 1,3-butadiene is particularly preferable. The conjugated diene monomers may be used as single type alone or as a plurality of types together.

The content of the conjugated diene monomer units (including part which is saturated by hydrogenation etc.) is preferably 25 to 84 wt % with respect to the total monomer units, more preferably 25 to 80 wt %, furthermore preferably 40 to 78 wt %. If the content of the conjugated diene monomer units is too small, the obtained cross-linked rubber is liable to fall in rubber elasticity, while if too large, it may be impaired in heat resistance and chemical stability.

Further, the carboxyl group-containing highly saturated nitrile rubber (A1) used in the present invention may be one copolymerizing a carboxyl group-containing monomer other than an α,β-ethylenically unsaturated dicarboxylic acid monoester monomer in a range not impairing the advantageous effects of the present invention.

As such a carboxyl group-containing monomer, acrylic acid, methacrylic acid, ethylacrylic acid, crotonic acid, cinnamic acid, and other α,β-ethylenically unsaturated monocarboxylic acid monomers; fumaric acid and maleic acid and other butenedionic acids, itaconic acid, citraconic acid, mesaconic acid, glutaconic acid, allylmalonic acid, teraconic acid, etc. may be mentioned. Further, as anhydrides of α,β-unsaturated polyvalent carboxylic acids, maleic anhydride, itaconic anhydride, citraconic anhydride, and other α,β-ethylenically unsaturated polyvalent carboxylic acid monomers; etc. may be mentioned.

The content of the units of the carboxyl group-containing monomers other than the α,β-ethylenically unsaturated dicarboxylic acid monoester monomers is preferably 20 wt % or less with respect to the total monomer units, more preferably 10 wt % or less, furthermore preferably 5 wt % or less.

Further, the carboxyl group-containing highly saturated nitrile rubber (A1) used in the present invention may be a copolymer of an α,β-ethylenically unsaturated nitrile monomer, α,β-ethylenically unsaturated dicarboxylic acid monoester monomer, conjugated diene monomer, and carboxyl group-containing monomer other than the α,β-ethylenically unsaturated dicarboxylic acid monoester monomer with other monomers which are copolymerizable with these. As the other monomer, ethylene, α-olefin monomer, aromatic vinyl monomer, α,β-ethylenically unsaturated carboxylic acid ester monomer (one without unsubstituted (free) carboxyl group which is not esterified), fluorine-containing vinyl monomer, copolymerizable anti-aging agent, etc. may be mentioned.

As the α-olefin monomer, a $C_3$ to $C_{12}$ one is preferable. For example, propylene, 1-butene, 4-methyl-1-pentene, 1-hexene, 1-octene, etc. may be mentioned.

As the aromatic vinyl monomer, for example, styrene, α-methylstyrene, vinyl pyridine, etc. may be mentioned.

As the α,β-ethylenically unsaturated carboxylic acid ester monomer, for example, methyl acrylate, ethyl acrylate, n-butyl acrylate, n-dodecyl acrylate, methyl methacrylate, ethyl methacrylate, and other (meth)acrylic acid esters which have $C_1$ to $C_{18}$ alkyl groups; methoxymethyl acrylate, methoxyethyl acrylate, methoxyethyl methacrylate, and other (meth)acrylic acid esters which have $C_2$ to $C_{12}$ alkoxyalkyl groups; α-cyanoethyl acrylate, α-cyanoethyl methacrylate, α-cyanobutyl methacrylate, and other (meth)acrylic acid esters which have $C_2$ to $C_{12}$ cyanoalkyl groups; 2-hydroxyethyl acrylate, 2-hydroxypropyl acrylate, 2-hydroxyethyl methacrylate, and other (meth)acrylic acid esters which have $C_1$ to $C_{12}$ hydroxyalkyl groups; trifluoroethyl acrylate, tetrafluoropropyl methacrylate, and other (meth)acrylic acid esters which have $C_1$ to $C_{12}$ fluoroalkyl groups; dimethyl maleate, dimethyl fumarate, dimethyl itaconate, diethyl itaconate, and other α,β-ethylenically unsaturated dicarboxylic acid dialkyl esters; dimethylaminomethyl acrylate, diethylaminoethyl acrylate, and other dialkyl amino group-containing α,β-ethylenically unsaturated carboxylic acid esters; etc. may be mentioned.

As the fluorine-containing vinyl monomers, for example, fluoroethylvinyl ether, fluoropropyl vinyl ether, o-trifluoromethylstyrene, vinyl pentafluorobenzoate, difluoroethylene, tetrafluoroethylene, etc. may be mentioned.

As the copolymerizable anti-aging agent, for example, N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinyl benzyloxy)aniline, N-phenyl-4-(4-vinyl benzyloxy)aniline, etc. may be mentioned.

As these copolymerizable other monomers, a plurality of types may also be used together. The content of the units of the other monomers is preferably 50 wt % or less with respect to the total monomer units, more preferably 30 wt % or less, furthermore preferably 10 wt % or less.

The carboxyl group-containing highly saturated nitrile rubber (A1) used in the present invention has an iodine value of preferably 120 or less, more preferably 60 or less, furthermore preferably 40 or less, particularly preferably 30 or less. By making the iodine value 120 or less, the obtained cross-linked rubber can be improved in heat resistance.

The carboxyl group-containing highly saturated nitrile rubber (A1) has a polymer Mooney viscosity ($ML_{1+4}$, 100° C.) of preferably 10 to 200, more preferably 20 to 150, furthermore preferably 30 to 110. If the carboxyl group-containing highly saturated nitrile rubber (A1) has a polymer Mooney viscosity which is too low, the obtained cross-linked rubber is liable to fall in mechanical properties, while conversely if too high, the rubber composition may fall in workability.

Further, the content of the carboxyl groups in the carboxyl group-containing highly saturated nitrile rubber (A1), that is, the number of moles of carboxyl groups per 100 g of the carboxyl group-containing highly saturated nitrile rubber (A1), is preferably 0.006 to 0.116 ephr, more preferably 0.012 to 0.087 ephr, particularly preferably 0.023 to 0.058 ephr. If the carboxyl group-containing highly saturated nitrile rubber (A1) has a carboxyl group content which is too small, the rollability falls and the obtained cross-linked rubber ends up becoming inferior in tensile strength under a high temperature. On the other hand, if too large, the compression set resistance and heat resistance are liable to fall.

The method of production of the carboxyl group-containing highly saturated nitrile rubber (A1) used in the present invention is not particularly limited, but it is preferable to use emulsion polymerization using an emulsifying agent to copolymerize the above-mentioned monomers to prepare a latex of copolymer rubber and hydrogenate this. At the time of emulsion polymerization, it is possible to use an emulsifying agent, polymerization initiator, molecular weight adjuster, or other usually used secondary polymerization materials.

The emulsifying agent is not particularly limited, but, for example, polyoxyethylenealkyl ether, polyoxyethylene-alkyl-phenol ether, polyoxyethylenealkyl ester, polyoxyethylene sorbitan alkyl ester, or other nonionic emulsifying agents; salts of myristic acid, palmitic acid, oleic acid, linoleic acid, or other fatty acids, sodium dodecylbenzene sulfonate or other alkylbenzene sulfonates, higher alcohol sulfuric ester salts, alkylsulfo-succinic acid salts, or other anionic emulsifying agents; sulfoesters of α,β-unsaturated carboxylic acids, sulfate esters of α,β-unsaturated carboxylic acids, sulfoalkyl aryl ether, or other copolymerizable emulsifying agents; etc. may be mentioned. The amount of use of the emulsifying agent is preferably 0.1 to 10 parts by weight with respect to 100 parts by weight of the total monomers.

The polymerization initiator is not particularly limited if it is a radical initiator, but potassium persulfate, sodium persulfate, ammonium persulfate, potassium perphosphate, hydrogen peroxide, or other inorganic peroxides; t-butyl peroxide, cumen hydroperoxide, p-mentane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, t-butyl peroxyisobutyrate, or other organic peroxides; azobisisobutyronitrile, azobis-2,4-dimethyl valeronitrile, azobiscyclohexane carbonitrile, methyl azobis isobutyrate, or other azo compounds; etc. may be mentioned. These polymerization initiators may be used alone or in two types or more combined. As a polymerization initiator, an inorganic or organic peroxide is preferable. When using a polymerization initiator comprised of a peroxide, it is possible to combine this with sodium hydrogen sulfite, ferrous sulfate, or other reducing agent for use as a redox type polymerization initiator. The amount of use of the polymerization initiator is preferably 0.01 to 2 parts by weight with respect to 100 parts by weight of the total monomers.

The molecular weight adjuster is not particularly limited, but t-dodecyl mercaptan, n-dodecyl mercaptan, octyl mercaptan, or other mercaptans; carbon tetrachloride, methylene chloride, methylene bromide, or other halogenated hydrocarbons; α-methylstyrene dimer; tetraethylthiuram disulfide, dipentamethylene thiuram disulfide, diisopropyl xantogen disulfide, or other sulfur-containing compounds etc. may be mentioned. These may be used alone or in two or more types combined. Among these as well, mercaptans are preferable, while t-dodecyl mercaptan is more preferable. The amount of use of the molecular weight adjuster is preferably 0.1 to 0.8 part by weight with respect to 100 parts by weight of the total monomers.

For the medium of the emulsion polymerization, usually, water is used. The amount of water is preferably 80 to 500 parts by weight with respect to 100 parts by weight of the total monomers.

At the time of emulsion polymerization, further, in accordance with need, a stabilizer, dispersant, pH adjuster, deoxidant, particle size adjuster, or other secondary polymerization materials may be used. In the case of using these, the types and amounts of use are also not limited.

Note that, when the copolymer obtained by copolymerization has an iodine value of higher than 120, to make the iodine value 120 or less, it is also possible to hydrogenate the copolymer (hydrogen addition reaction). In this case, the method of hydrogenation is not particularly limited. A known method may be employed.

Highly Saturated Nitrile Rubber (A2)

The highly saturated nitrile rubber (A2) used in the present invention is a rubber which contains α,β-ethylenically unsaturated nitrile monomer units in 15 to 60 wt %, has a content of the α,β-ethylenically unsaturated dicarboxylic acid monoester monomer units of 0.9 wt % or less, and has an iodine value of 120 or less. The highly saturated nitrile rubber (A2) used in the present invention is obtained by copolymerizing an α,β-ethylenically unsaturated nitrile monomer and a copolymerizable other monomer which is added in accordance with need.

As the α,β-ethylenically unsaturated nitrile monomer, it is possible to use one similar to the above-mentioned carboxyl group-containing highly saturated nitrile rubber (A1). The content of the α,β-ethylenically unsaturated nitrile monomer units in the highly saturated nitrile rubber (A2) is 15 to 60 wt % with respect to the total monomer units, preferably 18 to 55 wt %, more preferably 20 to 50. If the content of α,β-ethylenically unsaturated nitrile monomer units is too small, the obtained cross-linked rubber is liable to fall in oil resistance and fuel oil resistance, while, conversely, if too large, the cold resistance may fall.

Further, in the highly saturated nitrile rubber (A2) used in the present invention, as the monomer which copolymerizes with the α,β-ethylenically unsaturated nitrile monomer, a conjugated diene monomer is preferably used so that the obtained cross-linked rubber has a rubber elasticity. As the conjugated diene monomer, one similar to the above-mentioned carboxyl group-containing highly saturated nitrile rubber (A1) may be used. The content of the conjugated diene monomer units (including part which is saturated by hydrogenation etc.) in the highly saturated nitrile rubber (A2) is preferably 39.1 to 85 wt % with respect to the total monomer units, more preferably 44.5 to 82 wt %, furthermore preferably 50 to 80 wt %. If the content of the conjugated diene monomer units is too small, the obtained cross-linked rubber is liable to fall in rubber elasticity, while conversely if too large, the heat resistance and the chemical stability may become impaired.

Further, the highly saturated nitrile rubber (A2) used in the present invention may be one obtained by copolymerizing an α,β-ethylenically unsaturated nitrile monomer and conjugated diene monomer plus other monomer which is copolymerizable with the same. As such other monomer, in the same way as the above-mentioned carboxyl group-containing highly saturated nitrile rubber (A1), ethylene, an α-olefin monomer, an aromatic vinyl monomer, an α,β-ethylenically unsaturated carboxylic acid ester monomer (one without unsubstituted (free) carboxyl group which is not esterified), a fluorine-containing vinyl monomer, a copolymerizable anti-aging agent, etc. may be mentioned.

Further, in the highly saturated nitrile rubber (A2) used in the present invention, as the copolymerizable other monomer, an α,β-ethylenically unsaturated dicarboxylic acid monoester monomer may be used. However, the content of the α,β-ethylenically unsaturated dicarboxylic acid monoester monomer units is 0.9 wt % or less with respect to the total monomer units, preferably 0.5 wt % or less, while the content of the α,β-ethylenically unsaturated dicarboxylic acid monoester monomer units is particularly preferably 0 wt %. If the content of the α,β-ethylenically unsaturated dicarboxylic acid monoester monomer units is too large, the compression set resistance and heat resistance are liable to deteriorate. Note that, as the α,β-ethylenically unsaturated dicarboxylic acid monoester monomer, ones similar to the above-mentioned carboxyl group-containing highly saturated nitrile rubber (A1) may be mentioned.

Further, the highly saturated nitrile rubber (A2) used in the present invention may be one copolymerizing a carboxyl group-containing monomer other than an α,β-ethylenically unsaturated dicarboxylic acid monoester monomer in a range not impairing the advantageous effects of the present invention. However, the content of the carboxyl group-containing monomer units other than the α,β-ethylenically unsaturated dicarboxylic acid monoester monomer is preferably 5 wt % or less with respect to the total monomer units, more preferably 3 wt % or less, while the content of the carboxyl group-containing monomer units is particularly preferably 0 wt %. If the content of the carboxyl group-containing monomer units is too large, the compression set resistance and heat resistance are liable to deteriorate. Further, as the carboxyl group-containing monomer other than α,β-ethylenically unsaturated dicarboxylic acid monoester monomer, ones similar to the above-mentioned carboxyl group-containing highly saturated nitrile rubber (A1) may be mentioned.

The highly saturated nitrile rubber (A2) used in the present invention has an iodine value of preferably 120 or less, more preferably 60 or less, furthermore preferably 40 or less, particularly preferably 30 or less. By making the iodine value 120 or less, the obtained cross-linked rubber can be improved in heat resistance.

The highly saturated nitrile rubber (A2) has a polymer Mooney viscosity ($ML_{1+4}$, 100° C.) of preferably 10 to 200, more preferably 20 to 150, furthermore preferably 30 to 110. If the highly saturated nitrile rubber (A2) has a polymer Mooney viscosity which is too low, the obtained cross-linked rubber is liable to fall in mechanical properties, while conversely if too high, the rubber composition may fall in workability.

Further, the content of the carboxyl groups in the highly saturated nitrile rubber (A2), that is, the number of moles of carboxyl groups per 100 g of highly saturated nitrile rubber (A2), is preferably 0.005 ephr or less, more preferably 0.003 ephr or less, particularly preferably 0 ephr. If the highly saturated nitrile rubber (A2) is too large in content of carboxyl groups, the compression set resistance and heat resistance may deteriorate.

The content ratio of the carboxyl group-containing highly saturated nitrile rubber (A1) and highly saturated nitrile rubber (A2) in the highly saturated nitrile rubber composition of the present invention is, in terms of the weight ratio of the "carboxyl group-containing highly saturated nitrile rubber (A1):highly saturated nitrile rubber (A2)", 2:98 to 98:2 in range, preferably 3:97 to 50:50 in range, more preferably 5:95 to 40:60 in range. If the content ratio of the carboxyl group-containing highly saturated nitrile rubber (A1) is too large, the compression set resistance and heat resistance tend to fall. Further, if the content ratio of the highly saturated nitrile rubber (A2) is too large, the rollability falls and the obtained cross-linked rubber is liable to fall in normal physical properties and tensile strength under a high temperature.

Note that, when not using the highly saturated nitrile rubber (A2) at all, the compression set resistance and the tensile strength under a high temperature deteriorate considerably.

The method of production of the highly saturated nitrile rubber (A2) used in the present invention is not particularly limited, but may be made one similar to the above-mentioned carboxyl group-containing highly saturated nitrile rubber (A1).

Polyamide Resin (B)

The highly saturated nitrile rubber composition of the present invention contains a polyamide resin (B) in addition to the above-mentioned carboxyl group-containing highly saturated nitrile rubber (A1) and highly saturated nitrile rubber (A2). In the present invention, by jointly using a highly saturated nitrile rubber comprised of two types of rubber of the carboxyl group-containing highly saturated nitrile rubber (A1) which has a content of the α,β-ethylenically unsaturated dicarboxylic acid monoester monomer units within a predetermined range and highly saturated nitrile rubber (A2) which has a content of the α,β-ethylenically unsaturated dicarboxylic acid monoester monomer units of a predetermined amount or less and blending the polyamide resin (B) with this, the rubber composition can be made one excellent in rollability and, further, the cross-linked rubber after cross-linking may be made one which is excellent in normal physical properties, oil resistance, fuel oil resistance, and tensile strength under a high temperature.

Note that, to improve the oil resistance and fuel oil resistance of the highly saturated nitrile rubber, it is effective to mix a polyamide resin in the highly saturated nitrile rubber, but when just mixing a polyamide resin in the highly saturated nitrile rubber, sometimes inconveniences arise such as the rollability deteriorating, the obtained cross-linked rubber falling in tensile strength, and the hardness ending up becoming too high.

As opposed to this, in the present invention, by jointly using the above-mentioned carboxyl group-containing highly saturated nitrile rubber (A1) and highly saturated nitrile rubber (A2) and by blending into this the polyamide resin (B), it is possible to improve the rollability, possible to improve the oil resistance, fuel oil resistance, normal physical properties, and tensile strength under a high temperature when being made into a cross-linked rubber, and possible to keep the hardness from becoming too high.

The polyamide resin (B) used in present invention is not particularly limited so long as a polymer which has an acid-amide bond (—CONH—), but, for example, a polymer which is obtained by polycondensation of a diamine and a dibasic acid, a polymer which is obtained by polycondensation of diformyl or other diamine derivative and a dibasic acid, a polymer which is obtained by polycondensation of dimethyl ester or other dibasic acid derivative and a diamine, a polymer which is obtained by a reaction of a dinitrile or diamide and formaldehyde, a polymer which is obtained by polyaddition of a diisocyanate and dibasic acid, a polymer which is obtained by self condensation of an amino acid or its derivature, a polymer which is obtained by ring-opening polymerization of lactam, etc. may be mentioned. Further, these polyamide resins may contain polyether blocks.

As specific examples of the polyamide resin (B), Nylon 46, Nylon 6, Nylon 66, Nylon 610, Nylon 612, Nylon 11, Nylon 12, and other aliphatic polyamide resins; polyhexamethylenediamine terephthalamide, polyhexamethylene isophthalamide, xylene-containing polyamide, or other aromatic polyamide resin; may be mentioned. Among these as well, since the advantageous effects of the present invention become more remarkable, an aliphatic polyamide resin is preferable, Nylon 6, Nylon 66, Nylon 11, and Nylon 12 are more preferable, Nylon 6, Nylon 11, and Nylon 12 are furthermore preferable, and Nylon 6 and Nylon 12 are particularly preferable.

Further, the polyamide resin (B) used in the present invention preferably has a melting point of 100 to 300° C., more preferably 120 to 280° C., furthermore preferably 150 to 250° C. If the melting point is too low, the obtained cross-linked rubber is liable to fall in heat resistance, while if the melting point is too high, the rollability is liable to fall.

The content ratio of the polyamide resin (B) in the highly saturated nitrile rubber composition of the present invention is, with respect to the total of the carboxyl group-containing highly saturated nitrile rubber (A1) and the highly saturated nitrile rubber (A2) (below, sometimes referred to as the "total amount of nitrile rubber"), in terms of the weight ratio of the "total amount of nitrile rubber:content of polyamide resin (B)", preferably 95:5 to 50:50 in range, more preferably 90:10 to 60:40 in range. If the total amount of the nitrile rubber is too large, the oil resistance and the fuel oil resistance are liable to fall. On the other hand, if the content of the polyamide resin (B) is too large, the rollability is liable to deteriorate and the hardness is liable to become higher.

Cross-Linkable Nitrile Rubber Composition

The cross-linkable nitrile rubber composition of the present invention contains the above-mentioned highly saturated nitrile rubber composition which contains a carboxyl group-containing highly saturated nitrile rubber (A1), highly saturated nitrile rubber (A2), and polyamide resin (B) and an organic peroxide cross-linking agent (C). By using a cross-linking agent which is comprised of the organic peroxide cross-linking agent (C) in the cross-linkable nitrile rubber composition of the invention, the cross-linkable nitrile rubber composition is improved in workability and, further, the obtained cross-linked rubber is excellent in normal physical properties and tensile strength under a high temperature.

As the organic peroxide cross-linking agent (C), a conventionally known one can be used. Dicumyl peroxide, cumen hydroperoxide, t-butylcumyl peroxide, p-mentane hydroperoxide, di-t-butylperoxide, 1,3-bis(t-butylperoxyisopropyl)benzene, 1,4-bis(t-butylperoxyisopropyl)benzene, 1,1-di-t-butylperoxy-3,3-trimethylcyclohexane, 4,4-bis-(t-butyl-peroxy)-n-butylvalerate, 2,5-dimethyl-2,5-di-t-butylperoxyhexane, 2,5-dimethyl-2,5-di-t-butylperoxyhexine-3, 1,1-di-t-butylperoxy-3,5,5-trimethylcyclohexane, p-chlorobenzoyl peroxide, t-butylperoxyisopropyl carbonate, t-butylperoxybenzoate, etc. may be mentioned. Among these as well, 1,3-bis(t-butylperoxyisopropyl)benzene is preferable. These may be used as single type alone or as a plurality of types combined.

The amount of the organic peroxide cross-linking agent (C) in the cross-linkable nitrile rubber composition in the present invention is preferably 0.5 to 20 parts by weight with respect to 100 parts by weight of the total of the carboxyl group-containing highly saturated nitrile rubber (A1) and the highly saturated nitrile rubber (A2), more preferably 1 to 15 parts by weight, furthermore preferably 2 to 10 parts by weight. If the amount of the organic peroxide cross-linking agent (C) is too small, the obtained cross-linked rubber is liable to fall in mechanical properties. On the other hand, if too large, the obtained cross-linked rubber may deteriorate in fatigue resistance.

Further, the cross-linkable nitrile rubber composition of the present invention may have blended into it, in addition to the above, compounding agents which are usually used in the rubber field, for example, a reinforcing agent such as carbon black, silica, and staple fibers, filler such as calcium carbonate, and clay, cross-linking accelerator, cross-linking aid such as polyfunctional methacrylate monomer, cross-linking retardant, anti-aging agent, antioxidant, photostabilizer, scorch preventer such as primary amine, a silane coupling agent, plasticizer, processing aid, slip agent, tackifier, lubricant, flame retardant, antifungal agent, acid acceptor, antistatic agent, pigment, foam agent, etc. The amounts of these compounding agents are not particularly limited so long as not impairing the objects and effects of the present invention, but amounts in accordance with the purpose of inclusion may be included.

The cross-linkable nitrile rubber composition of the present invention may further have blended into it other polymer other than the above-mentioned carboxyl group-containing highly saturated nitrile rubber (A1), highly saturated nitrile rubber (A2), and polyamide resin (B) in a range not impairing the advantageous effects of the present invention. As the other polymer, an acrylic rubber, ethylene-acrylic acid copolymer rubber, fluororubber, styrene-butadiene copolymer rubber, polybutadiene rubber, ethylene-propylene copolymer rubber, ethylene-propylene-diene ternary copolymer rubber, epichlorohydrin rubber, urethane rubber, chloroprene rubber, silicone rubber, fluorosilicone rubber, chlorosulfonated polyethylene rubber, natural rubber, polyisoprene rubber, etc. may be mentioned. When blending in the other polymer, the amount in the cross-linkable nitrile rubber composition is preferably 30 parts by weight or less with respect to 100 parts by weight of the total of the carboxyl group-containing highly saturated nitrile rubber (A1) and the highly saturated nitrile rubber (A2), more preferably 20 parts by weight or less, furthermore preferably 10 part by weight or less.

Production of Highly Saturated Nitrile Rubber Composition

The method of production of the highly saturated nitrile rubber composition of the present invention comprises kneading the above-mentioned carboxyl group-containing highly saturated nitrile rubber (A1), highly saturated nitrile rubber (A2), and polyamide resin (B) preferably at a temperature of 200° C. or more.

The method of kneading these is not particularly limited, but the method of kneading by using a single screw extruder, twin screw extruder, or other extruder; a kneader, Bambury mixer, Brabender mixer, internal mixer, or other closed type kneader; roll kneader; and other kneaders etc. may be mentioned. Among these as well, in particular, for the reason of the high production efficiency and dispersion efficiency, the method of kneading by a twin screw extruder is preferable.

Further, when kneading the carboxyl group-containing highly saturated nitrile rubber (A1), highly saturated nitrile rubber (A2), and polyamide resin (B), the kneading temperature is preferably 200° C. or more, more preferably 250° C. or more, furthermore preferably 300° C. or more. Further, the upper limit of the kneading temperature is preferably 400° C. or less, particularly preferably 350° C. or less. By making the kneading temperature the above-mentioned range, the molten state polyamide resin (B), carboxyl group-containing highly saturated nitrile rubber (A1), and highly saturated nitrile rubber (A2) can be mixed to a better form. Further, due to this, the advantageous effects of the present invention become much more remarkable.

Further, when kneading the carboxyl group-containing highly saturated nitrile rubber (A1), highly saturated nitrile rubber (A2), and polyamide resin (B), the anti-aging agent and other various compounding agents or other rubber may be simultaneously mixed.

Preparation of Cross-Linkable Nitrile Rubber Composition

The method of preparation of the cross-linkable nitrile rubber composition of the present invention is not particularly limited, but it may be prepared by kneading into the highly saturated nitrile rubber composition of the present invention obtained in the above-mentioned way the ingredients other than the cross-linking agent and ingredients which are unstable against heat at, preferably, 10 to 200° C., more preferably 20 to 170° C., by a Bambury mixer, Brabender mixer, internal mixer, kneader, or other mixer, transferring the kneaded material to a roll etc., adding the cross-linking agent and ingredients which are unstable against heat etc., and secondary kneading this preferably under conditions of 10 to 80° C.

Cross-Linked Rubber

The cross-linked rubber of the present invention is obtained by cross-linking the above-mentioned cross-linkable nitrile rubber composition of the present invention.

The cross-linked rubber of the present invention can be produced by using the cross-linkable nitrile rubber composition of the present invention and, for example, molding it by a molding machine corresponding to its desired shape such as an extruder, injection molding machine, compressor, roll, etc., heating it to cause a cross-linking reaction, and fixing the shape as cross-linked rubber. In this case, it is possible to mold it in advance, then cross-link it or to mold and simultaneously cross-link it. The molding temperature is usually 10 to 200° C., preferably 25 to 120° C. The cross-linking temperature is usually 100 to 200° C., preferably 130 to 190° C., while the cross-linking time is usually 1 minute to 24 hours, preferably 2 minutes to 6 hours.

Further, depending on the shape, size, etc. of the cross-linked rubber, even if the surface is cross-linked, the insides will sometimes not be sufficiently cross-linked, so the rubber may be further heated for secondary cross-linking.

As the heating method, press heating, steam heating, oven heating, hot air heating, and other general methods which are used for cross-linking rubber may be suitably selected.

The thus obtained cross-linked rubber of the present invention is obtained by cross-linking the above-mentioned cross-linkable nitrile rubber composition of the present invention, so is excellent in normal physical properties, oil resistance, fuel oil resistance, and tensile strength under a high temperature.

For this reason, the cross-linked rubber of the present invention can be used for O-rings, packings, diaphragms, oil seals, shaft seals, bearing seals, well head seals, air compressor seals, seals for sealing in Freon or fluorohydrocarbons or carbon dioxide which is used for compressors for cooling devices for air conditioners or refrigerating machines of air-conditioning systems, seals for sealing in supercritical carbon dioxide or subcritical carbon dioxide which is used for the washing media in precision washing, seals for roller devices (roller bearings, automotive hub units, automotive water pumps, linear guide devices and ball screws, etc.), valves and valve seats, BOP (blow out preventers), bladders, and other various seal members; intake manifold gaskets which are attached at connecting parts of intake manifolds and cylinder heads, cylinder head gaskets which are attached at connecting parts of cylinder blocks and cylinder heads, rocker cover gaskets which are attached at connecting parts of rocker covers and cylinder heads, oil pan gaskets which are attached at connecting parts of oil pans and cylinder blocks or transmission cases, fuel cell separator use gaskets which are attached between pairs of housings straddling unit cells provided with positive electrodes, electrolyte plates, and negative electrodes, top cover use gaskets for hard disk drives, and other various types of gaskets; printing use rolls, ironmaking use rolls, papermaking use rolls, industrial use rolls, office equipment use rolls, and other various types of rolls; flat belts (film core flat belts, cord flat belts, laminated flat belts, single type flat belts, etc.), V-belts (wrapped V-belts, low edge V-belts, etc.), V-ribbed belts (single V-ribbed belts, double V-ribbed belts, wrapped V-ribbed belt, rubber-backed V-ribbed belts, top cog V-ribbed belts etc.), CVT use belts, timing belts, toothed belt, conveyor belts, oil immersed belts, and other various types of belts; fuel hoses, turbo air hoses, oil hoses, radiator hoses, heater hoses, water hoses, vacuum brake hoses, control hoses, air-conditioner hoses, brake hoses, power steering hoses, air hoses, marine hoses, risers, flow lines, and other various types of hoses; CVJ boots, propeller shaft boots, constant velocity joint boots, rack and pinion boots, and other various types of boots; cushion materials, dynamic dampers, rubber couplings, air springs, shock absorbers, and other attenuating member rubber parts; dust covers, automotive interior members, tires, covered cables, shoe soles, electromagnetic wave shields, binders for flexible printed circuits boards or other binders, fuel cell separators and also other broad applications in the fields of cosmetics and pharmaceuticals, fields in contact with food, the electronics field, etc. Among these as well, the cross-linked rubber of the present invention can be suitably used for seal materials, gaskets, belts, or hoses.

EXAMPLES

Below, the present invention will be explained based on more detailed examples, but the present invention is not limited to these examples. Note that, below, "parts" are based on weight unless otherwise indicated. Further, the tests and evaluations were performed as follows.

Composition of Rubber

The content ratios of the monomer units forming the highly saturated nitrile rubber were measured by the following methods.

That is, the content ratios of the mono n-butyl maleate units and methacrylic acid units were calculated by adding 2-butanone 100 ml to 2 mm square highly saturated nitrile rubber 0.2 g and stirring for 16 hours, then adding ethanol 20 ml and water 10 ml and, while stirring, using a 0.02N hydrous ethanol solution of potassium hydroxide for titration at room temperature by Thymolphthalein as an indicator to thereby find the number of moles of the carboxyl group to the highly saturated nitrile rubber 100 g, and converting the number of moles which were found to the amount of mono n-butyl maleate units or methacrylic acid units.

The content ratios of 1,3-butadiene units and saturated butadiene units were calculated by using highly saturated nitrile rubber and measuring the iodine values before a hydrogen addition reaction and after a hydrogen addition reaction (based on JIS K 6235).

The content ratio of acrylonitrile units was calculated by measuring the content of nitrogen in the highly saturated nitrile rubber by the Kjeldahl method in accordance with JIS K6383.

Iodine Value

The iodine value of the highly saturated nitrile rubber was measured in accordance with JIS K6235.

Carboxyl Group Content

The content was calculated by adding 2-butanone 100 ml to 2 mm square highly saturated nitrile rubber 0.2 g and stirring for 16 hours, then adding ethanol 20 ml and water 10 ml and, while stirring, using a 0.02N hydrous ethanol solution of potassium hydroxide for titration at room temperature by Thymolphthalein as an indicator to thereby find the number of moles of the carboxyl group to the highly saturated nitrile rubber: 100 g (units: ephr).

Mooney Viscosity (Polymer Mooney)

The Mooney viscosity (polymer Mooney) of the highly saturated nitrile rubber was measured in accordance with JIS K6300-1 (units: [$ML_{1+4}$, 100° C.]).

Rollability

The rollability when kneading the rubber composition by open rolls was evaluated by the following method.

Using 6-inch open rolls and with a rotation ratio of 1:1.4, a roll gap of 1.4 mm, a roll temperature of 50° C., the rubber composition was kneaded by the back roll. The following evaluation criteria was used with 5 points being full points. The higher the number of points, the better the wrapability to the rolls and the better the rollability. Note that, below "bagging" is the phenomenon where during the rolling, the rubber does not firmly wrap around the rolls and sags down.

(Evaluation Criteria)

Number of points 5: No bagging at all, roll wrapability outstandingly good.

Number of points 4: Almost no bagging, roll wrapability good.

Number of points 3: Some bagging, but roll wrapability somewhat good.

Number of points 2: Wrapping around rolls possible somehow, but bagging immediately ends up occurring or rubber ends up detaching from rolls, so rollability is poor.

Number of points 1: Wrapping around rolls somewhat difficult and rollability extremely poor.

Normal Physical Properties (Tensile Strength, Elongation, Hardness)

The cross-linkable nitrile rubber composition was placed in a vertical 15 cm, horizontal 15 cm, depth 0.2 cm mold and press formed by pressing by a press pressure of 10 MPa at 170° C. for 20 minutes to obtain a sheet-shaped cross-linked rubber. Next, the obtained sheet-shaped cross-linked rubber was punched to a No. 3 dumbbell shape to prepare a test piece. Further, the obtained test piece was used to measure the tensile strength and elongation of the cross-linked rubber in accordance with JIS K6251 and, further, the hardness of the cross-linked rubber using a Durometer hardness tester (Type A) in accordance with JIS K6253.

High Temperature Tensile Test

The same procedure was followed as in the evaluation of the above-mentioned normal physical properties to obtain sheet-shaped cross-linked rubber, then the obtained sheet-shaped cross-linked rubber was punched into a No. 3 dumbbell shape to prepare a test piece. Further, the obtained test piece was used to perform a tensile test at 100° C. based on JIS K6251 using a tensile test machine with a thermostatic tank so as to measure the tensile strength and elongation of the cross-linked rubber under a high temperature environment.

Fuel Oil Resistance Test

The same procedure was followed as in the evaluation of the above-mentioned normal physical properties to obtain sheet-shaped cross-linked rubber, then, in accordance with JIS K6258, the cross-linked rubber was immersed, under conditions of a temperature of 40° C. for 72 hours, in isooctane/toluene=50/50 (volume ratio) test fuel oil (Fuel-C) so as to perform a fuel oil resistance test. Further, the volumes of the cross-linked rubber before and after immersion in the test fuel oil were measured and the rate of change of the volume after immersion $\Delta V$ (unit: %) was calculated in accordance with "rate of change of volume $\Delta V$=([volume after immersion-volume before immersion]/volume before immersion)×100" so as to evaluate the fuel oil resistance. The smaller the value of the rate of change of volume $\Delta V$, the smaller the degree of swelling due to fuel oil and the better the fuel oil resistance that can be judged.

Oil Resistance Test

The same procedure as in the evaluation of the above-mentioned normal physical properties was performed to obtain sheet-shaped cross-linked rubber, then in accordance with JIS K6258, the cross-linked product was immersed, under conditions of a temperature of 150° C. for 72 hours, in test oil (IRM903) for 72 hours so as to perform an oil resistance test. Specifically, the volumes of the cross-linked rubber before and after immersion in the test fuel were measured and the rate of change of the volume after immersion $\Delta V$ (unit: %) was calculated in accordance with "rate of change of volume $\Delta V$=([volume after immersion in oil]/volume before immersion in oil]/volume before immersion in oil)×100" so as to evaluate the oil resistance. The smaller the value of the rate of change of volume $\Delta V$, the smaller the degree of swelling due to oil and the better the oil resistance that can be judged.

Compression Set Test

A cross-linkable nitrile rubber composition was primarily cross-linked by pressing using a mold at a temperature of 170° C. for 25 minutes to obtain a diameter 29 mm, height 12.5 mm columnar cross-linked rubber. Further, the obtained cross-linked rubber was used to measure the compression set in accordance with JIS K 6262 under condition holding the cross-linked rubber at 150° C. for 72 hours in the state compressing it by 25%. The smaller this value, the better the compression set resistance.

Synthesis Example 1 (Synthesis of Carboxyl Group-Containing Highly Saturated Nitrile Rubber (a1))

To a reactor, ion exchanged water 180 parts, concentration 10 wt % sodium dodecylbenzene sulfonate aqueous solution 25 parts, acrylonitrile 37 parts, mono n-butyl maleate 6 parts, and t-dodecyl mercaptan (molecular weight adjuster) 0.5 part were successively charged. The inside gas was replaced with nitrogen three times, then 1,3-butadiene 57 parts was charged. The reactor was held at 5° C., then cumen hydroperoxide (polymerization initiator) 0.1 part was charged. While stirring, the polymerization reaction was continued for 16 hours. Next, concentration 10 wt % hydroquinone aqueous solution (polymerization terminator) 0.1 part was added to stop the polymerization reaction, then a water temperature 60° C. rotary evaporator was used to remove the residual monomers and obtain a latex of carboxyl group-containing nitrile rubber (solid content concentration about 30 wt %).

Next, to make the content of palladium with respect to the dry weight of rubber contained in the latex, which is obtained by the above, 1,000 ppm, the autoclave was charged with the latex and a palladium catalyst (solution of mixture of 1 wt % palladium acetate acetone solution and equal weight of ion exchanged water) and a hydrogen addition reaction was performed at a hydrogen pressure of 3 MPa and temperature of 50° C. for 6 hours to obtain a latex of carboxyl group-containing highly saturated nitrile rubber (a1).

Further, two volumes of methanol was added to the obtained latex to coagulate it, then the result was filtered to take out the solids (crumbs). The crumbs were vacuum dried at 60° C. for 12 hours to obtain the carboxyl group-containing highly saturated nitrile rubber (a1). The composition of the obtained carboxyl group-containing highly saturated nitrile rubber (a1) was acrylonitrile units 35.6 wt %, butadiene units (including saturated parts) 59.0 wt %, and mono n-butyl maleate units 5.4 wt %. The iodine value was 7, the content of carboxyl groups was $3.1 \times 10^{-2}$ ephr, and the polymer Mooney viscosity [$ML_{1+4}$, 100° C.] was 55.

Synthesis Example 2 (Synthesis of Highly Saturated Nitrile Rubber (a2))

In a reactor, to ion exchanged water 200 parts, sodium carbonate 0.2 part was dissolved. To this, fatty acid potassium soap (potassium salt of fatty acid) 2.25 parts was added to prepare a soap aqueous solution. Further, to this soap aqueous solution, acrylonitrile 42 parts and t-dodecyl mercaptan (molecular weight adjuster) 0.45 part were successively charged. The gas at the inside was substituted with nitrogen three times, then 1,3-butadiene 58 parts was charged. Next, the inside of the reactor was held at 5° C., then cumen hydroperoxide (polymerization initiator) 0.1 part, a reducing agent, and a chelating agent were charged in suitable amounts. While holding the temperature at 5° C., a polymerization reaction was performed for 16 hours. Next, a concentration 10% hydroquinone (polymerization terminator) aqueous solution 0.1 part was added to stop the polymerization reaction, then a water temperature 60° C. rotary evaporator was used to remove the residual monomer to obtain a latex of nitrile rubber (solid content concentration of about 25 wt %).

Next, the latex obtained in above mentioned way was stirred while adding an aqueous solution of aluminum sulfate in an amount of 3 wt % with respect to the amount of the nitrile rubber so as to coagulate the latex, then the result was washed with water while filtering them, then was vacuum dried at 60° C. for 12 hours to obtain nitrile rubber. Further, the obtained nitrile rubber was dissolved in acetone to a concentration of 12%. This was placed in an autoclave, then a palladium-silica catalyst was added to the nitrile rubber to 500 weight ppm and a hydrogen addition reaction was performed at a hydrogen pressure of 3.0 MPa. After the end of the hydrogen addition reaction, the rubber was poured into a large amount of water to cause it to coagulate and highly saturated nitrile rubber (a2) was obtained by filtration and dried. The composition of the obtained highly saturated nitrile rubber (a2) was acrylonitrile units 40.5 wt % and butadiene units (including saturated parts) 59.5 wt %. The iodine value was 7, while the polymer Mooney viscosity [$ML_{1+4}$, 100° C.] was 100. Further, the highly saturated nitrile rubber (a2) was measured for the content of carboxyl groups in accordance with the above-mentioned method, whereupon it was less than the detection limit. Carboxyl groups were substantially not contained.

Synthesis Example 3 (Synthesis of Methacrylic Acid Unit-Containing Highly Saturated Nitrile Rubber)

To a reactor, ion exchanged water 180 parts, concentration 10 wt % sodium dodecylbenzene sulfonate aqueous solution 25 parts, acrylonitrile 37 parts, methacrylic acid 4 parts, and t-dodecyl mercaptan (molecular weight adjuster) 0.5 part were successively charged. The inside gas was replaced with nitrogen three times, then 1,3-butadiene 59 parts was charged. The reactor was held at 5° C., then cumen hydroperoxide (polymerization initiator) 0.1 part was charged. While stirring, the polymerization reaction was continued for 16 hours. Next, concentration 10 wt % hydroquinone aqueous solution (polymerization terminator) 0.1 part was added to stop the polymerization reaction, then a water temperature 60° C. rotary evaporator was used to remove the residual monomers and obtain a latex of methacrylic acid unit-containing nitrile rubber (solid content concentration: about 30 wt %).

Next, a hydrogen addition reaction was performed on the obtained latex in the same way as the above-mentioned Synthesis Example 1 to obtain a latex of methacrylic acid unit-containing highly saturated nitrile rubber. This was coagulated, filtered, and vacuum dried to obtain a methacrylic acid unit-containing highly saturated nitrile rubber. The composition of the obtained methacrylic acid unit-containing highly saturated nitrile rubber was acrylonitrile units 36 wt %, butadiene units (including parts not saturated) 61 wt %, and methacrylic acid units 3 wt %. The iodine value was 9, the content of carboxyl groups was $3.5 \times 10^{-2}$ ephr, and the polymer Mooney viscosity [$ML_{1+4}$, 100° C.] was 68.

Example 1

21 parts of the carboxyl group-containing highly saturated nitrile rubber (a1) obtained at Synthesis Example 1, 49 parts of the highly saturated nitrile rubber (a2) obtained at Synthesis Example 2, and Nylon 12 (product name "UBESTA 3014U", made by Ube Industries, melting point 180° C., where melting point of polyamide resin is melting peak temperature measured by differential scan calorimetry (DSC) defined by JIS K7121) 30 parts were kneaded using a twin screw extruder at 220° C. to obtain a highly saturated nitrile rubber composition.

Further, a Bambury mixer was used to add to and knead with the highly saturated nitrile rubber composition obtained above 100 parts, MT Carbon (product name "Thermax MT", made by Cancarb, carbon black) 40 parts, tri-2-ethylhexyl trimellitate (product name "ADK CIZER C-8", made by ADEKA, plasticizer) 10 parts, 4,4'-di-(α,α-dimethylbenzyl) diphenylamine (product name "Nocrac CD", made by Ouchi Shinko Chemical Industries, anti-aging agent) 1.5 parts, and stearic acid 1 part. Next, the mixture was transferred to rolls where 1,3-bis(t-butylperoxyisopropyl)benzene 40% product (product name "Vul Cup 40KE", made by GEO Specialty Chemicals Inc., organic peroxide cross-linking agent) 7 parts was added and kneaded to obtain a cross-linkable nitrile rubber composition.

Further, the above-mentioned methods were used for evaluation and tests of the rollability, normal physical properties, high temperature tensile test, fuel oil resistance, oil resistance, and compression set resistance. The results are shown in Table 1.

Example 2

When obtaining a highly saturated nitrile rubber composition, except for changing the temperature when using a twin screw extruder to knead the carboxyl group-containing highly saturated nitrile rubber (a1), highly saturated nitrile rubber (a2), and Nylon 12 from 220° C. to 320° C., the same procedure was followed as in Example 1 to prepare a cross-linkable nitrile rubber composition and evaluate the same. The results are shown in Table 1.

Example 3

When obtaining a highly saturated nitrile rubber composition, except for blending in, instead of Nylon 12, the same amount of Nylon 6 (product name "UBE Nylon P1011U", made by Ube Industries, melting point 220° C.), the same procedure was followed as in Example 2 to prepare a cross-linkable nitrile rubber composition and evaluate the same. The results are shown in Table 1.

Example 4

When obtaining a highly saturated nitrile rubber composition, except for changing the amount of the carboxyl group-containing highly saturated nitrile rubber (a1) from 21 parts to 10.5 parts and the amount of the highly saturated nitrile rubber (a2) from 49 parts to 59.5 parts, the same procedure was followed as in Example 2 to prepare a cross-linkable nitrile rubber composition and evaluate the same. The results are shown in Table 1.

Example 5

When obtaining a highly saturated nitrile rubber composition, except for changing the amount of the carboxyl group-containing highly saturated nitrile rubber (a1) from 21 parts to 24 parts, the amount of the highly saturated nitrile rubber (a2) from 49 parts to 56 parts, and the amount of Nylon 12 from 30 parts to 20 parts, the same procedure was followed as in Example 1 to prepare a cross-linkable nitrile rubber composition and evaluate the same. The results are shown in Table 1.

Comparative Example 1

When obtaining a highly saturated nitrile rubber composition, except for not blending in a carboxyl group-containing highly saturated nitrile rubber (a1) and changing the amount of the highly saturated nitrile rubber (a2) from 49 parts to 70 parts, the same procedure was followed as in Example 1 to prepare a cross-linkable nitrile rubber composition and evaluate the same. The results are shown in Table 1.

Comparative Example 2

When obtaining a highly saturated nitrile rubber composition, except for changing the kneading temperature from 220° C. to 320° C., the same procedure was followed as in Comparative Example 1 to prepare a cross-linkable nitrile rubber composition and evaluate the same. The results are shown in Table 1.

Comparative Example 3

When obtaining a highly saturated nitrile rubber composition, except for blending in, instead of Nylon 12, the same amount of Nylon 6, the same procedure was followed as in Comparative Example 2 to prepare a cross-linkable nitrile rubber composition and evaluate the same. The results are shown in Table 1.

Comparative Example 4

When obtaining a highly saturated nitrile rubber composition, except for using, instead of the carboxyl group-containing highly saturated nitrile rubber (a1), the same amount of the methacrylic acid unit-containing highly saturated nitrile rubber obtained in Synthesis Example 3, the same procedure was followed as in Example 2 to obtain a cross-linkable rubber composition and evaluate the same. The results are shown in Table 1.

Comparative Example 5

When obtaining a highly saturated nitrile rubber composition, except for not blending in a carboxyl group-containing highly saturated nitrile rubber (a1) and changing the amount of the highly saturated nitrile rubber (a2) from 49 parts to 80 parts and the amount of the Nylon 12 from 30 parts to 20 parts, the same procedure was followed as in Example 1 to prepare a cross-linkable nitrile rubber composition and evaluate the same. The results are shown in Table 1.

Comparative Example 6

When preparing a cross-linkable nitrile rubber composition, except for not using the carboxyl group-containing highly saturated nitrile rubber (a1) and Nylon 12 and directly supplying highly saturated nitrile rubber (a2) 100 parts to a Bambury mixer, the same procedure was followed as in Example 1 to prepare a cross-linkable nitrile rubber composition and evaluate the same. The results are shown in Table 1. That is, in Comparative Example 6, no carboxyl group-containing highly saturated nitrile rubber (a1) and Nylon 12 are used, so kneading of the highly saturated nitrile rubber and polyamide resin (Nylon 12) by using a twin screw extruder was not performed.

Comparative Example 7

When preparing a cross-linkable nitrile rubber composition, except for not using Nylon 12 and directly supplying a carboxyl group-containing highly saturated nitrile rubber (a1) 30 parts and highly saturated nitrile rubber (a2) 70 parts to a Bambury mixer, the same procedure was followed as in Example 1 to prepare a cross-linkable nitrile rubber composition and evaluate the same. The results are shown in Table 1. That is, in Comparative Example 7, Nylon 12 is not used, so kneading of the highly saturated nitrile rubber and polyimide resin (Nylon 12) by using a twin screw extruder was not performed.

Comparative Example 8

When obtaining a highly saturated nitrile rubber composition, except for not blending in a highly saturated nitrile rubber (a2) and changing the amount of the carboxyl group-containing highly saturated nitrile rubber (a1) from 21 parts to 70 parts, the same procedure was followed as in Example 1 to prepare a cross-linkable nitrile rubber composition and evaluate the same. The results are shown in Table 1.

TABLE 1

|  |  | Examples | | | | | Comparative Examples | | | | | | | |
|---|---|---|---|---|---|---|---|---|---|---|---|---|---|---|
|  |  | 1 | 2 | 3 | 4 | 5 | 1 | 2 | 3 | 4 | 5 | 6 | 7 | 8 |
| Formulation | | | | | | | | | | | | | | |
| Carboxyl group-containing highly saturated nitrile rubber (a1) | (parts) | 21 | 21 | 21 | 10.5 | 24 | — | — | — | — | — | — | 30 | 70 |
| Highly saturated nitrile rubber (a2) | (parts) | 49 | 49 | 49 | 59.5 | 56 | 70 | 70 | 70 | 49 | 80 | 100 | 70 | — |
| Methacrylic acid unit-containing highly saturated nitrile rubber | (parts) | — | — | — | — | — | — | — | — | 21 | — | — | — | — |
| Nylon 12 | (parts) | 30 | 30 | — | 30 | 20 | 30 | 30 | — | 30 | 20 | — | — | 30 |
| Nylon 6 | (parts) | — | — | 30 | — | — | — | — | 30 | — | — | — | — | — |
| MT carbon black | (parts) | 40 | 40 | 40 | 40 | 40 | 40 | 40 | 40 | 40 | 40 | 40 | 40 | 40 |
| Tri-2-ethylhexyl trimellitate | (parts) | 10 | 10 | 10 | 10 | 10 | 10 | 10 | 10 | 10 | 10 | 10 | 10 | 10 |
| 4,4'-di-($\alpha,\alpha$-dimethylbenzyl) diphenylamine | (parts) | 1.5 | 1.5 | 1.5 | 1.5 | 1.5 | 1.5 | 1.5 | 1.5 | 1.5 | 1.5 | 1.5 | 1.5 | 1.5 |
| Stearic acid | (parts) | 1 | 1 | 1 | 1 | 1 | 1 | 1 | 1 | 1 | 1 | 1 | 1 | 1 |
| 1,3-bis(t-butylperoxyisopropyl) benzene (40% product) | (parts) | 7 | 7 | 7 | 7 | 7 | 7 | 7 | 7 | 7 | 7 | 7 | 7 | 7 |
| Kneading temperature of highly saturated nitrile rubber and polyamide resin | (° C.) | 220 | 320 | 320 | 320 | 220 | 220 | 320 | 320 | 320 | 220 | No twin screw kneading | No twin screw kneading | 220 |

TABLE 1-continued

|  |  | Examples | | | | | Comparative Examples | | | | | | | |
|---|---|---|---|---|---|---|---|---|---|---|---|---|---|---|
|  |  | 1 | 2 | 3 | 4 | 5 | 1 | 2 | 3 | 4 | 5 | 6 | 7 | 8 |
| Rollability | | | | | | | | | | | | | | |
| Evaluation score (5-point total) | | 3 | 4 | 4 | 4 | 4 | 1 | 2 | 2 | 2 | 2 | 4 | 4 | 3 |
| Normal physical properties | | | | | | | | | | | | | | |
| Tensile strength | (MPa) | 28.7 | 28.1 | 29.2 | 26.1 | 23.9 | 16.3 | 15.4 | 15.8 | 21.7 | 16.8 | 20.0 | 21.0 | 24.1 |
| Elongation | (%) | 260 | 240 | 230 | 240 | 300 | 230 | 240 | 260 | 230 | 250 | 380 | 390 | 300 |
| Hardness (DURO A) | | 81 | 78 | 78 | 78 | 70 | 85 | 83 | 84 | 83 | 73 | 61 | 62 | 81 |
| High temperature tensile test | | | | | | | | | | | | | | |
| Tensile strength | (MPa) | 17.8 | 17.1 | 16.5 | 15.2 | 13.1 | 10.1 | 9.0 | 7.4 | 11.4 | 7.9 | 5.4 | 4.3 | 10.3 |
| Elongation | (%) | 150 | 150 | 140 | 140 | 150 | 120 | 120 | 130 | 130 | 120 | 140 | 130 | 140 |
| Fuel oil resistance test (Fuel C, 40° C., 72 hours) | | | | | | | | | | | | | | |
| Rate of change of volume | (%) | +31.7 | +30.1 | +32.3 | +30.7 | 38.3 | +32.8 | +33.0 | +33.4 | +34.0 | +38.9 | +48.3 | +50.1 | +33.9 |
| Oil resistance test (IRM903, 150° C., 72 hours) | | | | | | | | | | | | | | |
| Rate of change of volume | (%) | +0.8 | +0.4 | +1.0 | +0.3 | +2.6 | +0.8 | +0.5 | +1.1 | +1.2 | +2.7 | +5.5 | +6.2 | +1.5 |
| Compression set resistance (150° C., 72 hours) | | | | | | | | | | | | | | |
| Compression set | (%) | 42 | 33 | 37 | 32 | 38 | 56 | 40 | 46 | 51 | 55 | 23 | 28 | 68 |

From Table 1, when using a highly saturated nitrile rubber composition which contains the carboxyl group-containing highly saturated nitrile rubber (a1), highly saturated nitrile rubber (a2), and polyamide resin, the rollability was excellent, the obtained cross-linked rubber could be kept from becoming too high in hardness of the cross-linked product, and the oil resistance, fuel oil resistance, and tensile strength under a high temperature were excellent (Examples 1 to 5).

On the other hand, when not blending in the carboxyl group-containing highly saturated nitrile rubber (a1), the rollability was inferior, the obtained cross-linked rubber became inferior in tensile strength and tensile strength under a high temperature (Comparative Examples 1 to 3 and 5), and the hardness also ended up becoming higher (Comparative Examples 1 to 3).

Also, when using a methacrylic acid unit-containing highly saturated nitrile rubber instead of the carboxyl group-containing highly saturated nitrile rubber (a1), the rollability was inferior, the obtained cross-linked rubber ended up becoming higher in hardness, and the tensile strength and tensile strength under a high temperature became inferior (Comparative Example 4).

Further, when not blending in a polyamide resin, the obtained cross-linked rubber became inferior in tensile strength under a high temperature, oil resistance, and fuel oil resistance (Comparative Examples 6 and 7).

And, when not blending in the highly saturated nitrile rubber (a2), tensile strength under a high temperature and the compression set resistance became inferior (Comparative Example 8).

The invention claimed is:

1. A cross-linked rubber obtained by cross-linking a cross-linkable nitrile rubber composition
the cross-linkable nitrile rubber composition containing:
a carboxyl group-containing nitrile rubber (A1) which contains α,β-ethylenically unsaturated nitrile monomer units 15 to 60 wt % and α,β-ethylenically unsaturated dicarboxylic acid monoester monomer units 2 to 20 wt % and has an iodine value of 120 or less,
a nitrile rubber (A2) which contains α,β-ethylenically unsaturated nitrile monomer units 15 to 60 wt %, has a content of the α,β-ethylenically unsaturated dicarboxylic acid monoester monomer units of 0.9 wt % or less, and has an iodine value of 120 or less,
a polyamide resin (B), and
an organic peroxide cross-linking agent (C), wherein
a content ratio of said carboxyl group-containing nitrile rubber (A1) and said nitrile rubber (A2) in the cross-linkable nitrile rubber composition is a weight ratio of "carboxyl group-containing nitrile rubber (A1):nitrile rubber (A2)" of 5:95 to 40:60, and
the tensile strength at 100° C. of the cross-linked rubber is 13.1 MPa or more.

2. The cross-linked rubber as set forth in claim 1 wherein said polyamide resin (B) has a melting point of 100 to 300° C.

3. The cross-linked rubber as set forth in claim 1 wherein the α,β-ethylenically unsaturated dicarboxylic acid monoester monomer units of said carboxyl group-containing nitrile rubber (A1) are monoalkyl ester units of maleic acid.

4. The cross-linked rubber as set forth in claim 1 wherein a content of said polyamide resin (B) with respect to a total amount of said carboxyl group-containing nitrile rubber (A1) and said nitrile rubber (A2) is, by weight ratio of "total amount of carboxyl group-containing nitrile rubber (A1) and nitrile rubber (A2):content of polyamide resin (B)", 95:5 to 50:50.

5. The cross-linked rubber as set forth in claim 1 wherein the cross-linkable nitrile rubber composition is obtained by kneading said carboxyl group-containing nitrile rubber (A1), said nitrile rubber (A2), and said polyamide resin (B) at a temperature of 200° C. or more.

6. The cross-linked rubber as set forth in claim 5 wherein the cross-linkable nitrile rubber composition is obtained by kneading said carboxyl group-containing nitrile rubber (A1), said nitrile rubber (A2), and said polyamide resin (B) at a temperature of 200° C. or more by a twin screw extruder.

7. The cross-linked rubber as set forth in claim 1 which is a seal, gasket, belt, or hose.

8. A method of production of the cross-linked rubber as set forth in claim 1 comprising kneading said carboxyl group-containing nitrile rubber (A1), said nitrile rubber (A2), and said polyamide resin (B) at a temperature of 200° C. or more so as to obtain a nitrile rubber composition, blending an organic peroxide cross-linking agent (C) into the nitrile rubber composition so as to obtain a cross-linkable nitrile rubber composition, and cross-linking the cross-linkable nitrile rubber composition.

9. The method of production of the cross-linked rubber as set forth in claim 8 wherein the kneading said carboxyl group-containing nitrile rubber (A1), said nitrile rubber (A2), and said polyamide resin (B) is performed by using a twin screw extruder.

10. The cross-linked rubber as set forth in claim 1 wherein the elongation at 100° C. of the cross-linked rubber is 140% or more.

* * * * *